May 3, 1960        J. M. LINKE        2,935,703
ECHO WAVEFORM CORRECTORS
Filed March 21, 1957        3 Sheets-Sheet 1

INVENTOR
Josef M. Linke,
BY Hall + Houghton
ATTORNEY

May 3, 1960          J. M. LINKE          2,935,703

ECHO WAVEFORM CORRECTORS

Filed March 21, 1957          3 Sheets-Sheet 2

INVENTOR
Josef M. Linke,
BY
Hall & Houghton
ATTORNEY

May 3, 1960　　　　　J. M. LINKE　　　　2,935,703
ECHO WAVEFORM CORRECTORS
Filed March 21, 1957　　　　　　　　　　3 Sheets-Sheet 3

INVENTOR
Josef M. Linke,
BY
　　　　ATTORNEY

United States Patent Office 2,935,703
Patented May 3, 1960

---

2,935,703

ECHO WAVEFORM CORRECTORS

Josef Maria Linke, Dollis Hill, England, assignor to Her Majesty's Postmaster General of the General Post Office, London, England Application March 21, 1957, Serial No. 647,674

Claims priority, application Great Britain March 23, 1956

6 Claims. (Cl. 333—20)

---

The present invention relates to echo waveform correctors or time equalisers and has for an object to provide an improved echo waveform corrector.

According to the invention an echo waveform corrector or time equaliser includes a delay line, an echo generating circuit, and apparatus comprising hybrid transformer windings or means connecting the delay line and the echo generating circuit respectively to the input and output of the corrector, and providing a main path for transmission of the signal through the delay line to the output and an auxiliary or echo path for transmitting the echo from the echo generating circuit to the output without passing through the delay line, and means at the output of the corrector for combining the delayed signal and the echo, the time relation between the signal and the echo at the output being thus dependent on the delay time of the delay line.

The advanced or retarded echoes added to a signal in a waveform corrector or time equaliser need not be true or approximate replicas of the signal and it has been shown that as an alternative, derivatives or integrals of the signal can be employed.

Derivatives of the amplitude/time function of a signal have a frequency spectrum which can be obtained by modifying the spectrum of the signal by a factor proportional to frequency. Derivatives obtained in this manner, therefore, contain substantially no energy at zero frequency and at low frequencies their energy is very small so that it is possible to transmit them through transformers without appreciable distortion.

By employing such derivatives in the waveform corrector according to the invention, a transformer or transformers may be included in the said connecting means for transmitting the echoes from the echo generating means and in a preferred embodiment of the invention a hybrid or differential transformer is employed for separating the signal from the echo at the input end of the equaliser.

The invention will now be described with reference to the accompanying drawings in which.

Figure 1:
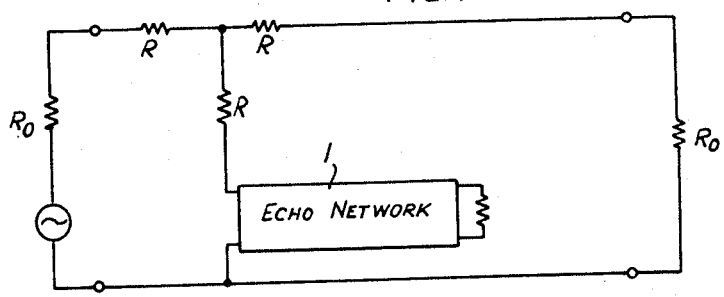
Figure 1 is a diagrammatic circuit of a known form of a simple echo waveform corrector.

In Figure 1 of the accompanying drawings there is shown a simple echo waveform corrector circuit of known construction but which provides for trailing echoes only. As will be apparent from Figure 1 transformers are not required and the coupling between the echo generating network 1 and the signal path between the input and the output can be modified by varying the impedance relations of the several impedances R shown in the figure.

Figure 2:
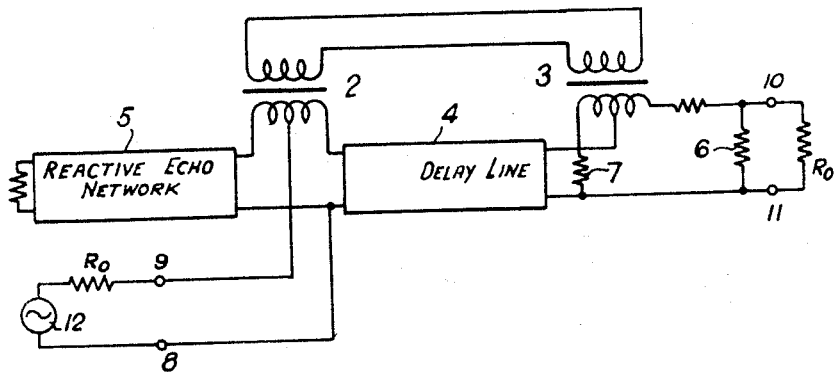
Figure 2 is a circuit of one form of waveform corrector according to the invention.

Figure 2 of the accompanying drawings shows one form of circuit of an echo waveform corrector according to the invention and adapted to provide for both advanced and retarded echoes. The corrector shown in Figure 2 comprises a first hybrid or differential transformer 2, means coupled to a second hybrid or differential transformer means 3, a delay line 4, a reactive echo network 5, a matching pad 6 and a balancing resistor 7. One input terminal 8 of the corrector is connected to the input of the delay line 4 and to the input of the reactive echo network 5, the other input terminal 9 being connected to the central tapping of one winding of the differential transformer 2, the ends of which winding are connected respectively to the inputs of the delay line 4 and the reactive echo network 5. The other winding of the transformer 2 is connected to a corresponding winding of the transformer 3, the centre tapping of the other winding of the transformer 3 being connected to the output of the delay line. One end of the said other winding is connected to one output terminal 10 of the corrector, while the other end of the said other winding is connected through the balancing resistor 7 to the output from the delay line which is also connected to the other output terminal 11 of the corrector. The matching pad 6 is connected across the output terminals 10 and 11.

In operation of the corrector shown in Figure 2 a signal generated from a source 12 enters the centre tapping of the first differential transformer means 2, and half the energy of the signal is transmitted through the delay line 4 and is then distributed through the centre tapping of the second differential transformer means 3 to the output via the matching pad 6 and the balancing resistor 7. The other half of the input signal energy is delivered into the echo network 5 which may consist, for example, of a terminated delay line containing variable shunt capacitors. Half of the energy of the reactive echo generated by the network 5 will be returned to the input terminals 8 and 9, and the other half will be transmitted through the differential transformers 2 and 3 and be combined with the main signal after passing of the latter through the delay line 4. Thus in the arrangement of Figure 2 the input signal is not transmitted through the transformers 2 and 3 but passes solely through the delay line 4, while the echoes are transmitted through the transformers but are not transmitted through the delay line and therefore the components of the output signal, i.e. the input signal delayed by the delay line, and the echoes, can be assembled with arbitrary timing which is dependent upon and determined by the delay of the delay line 4.

Figure 3:
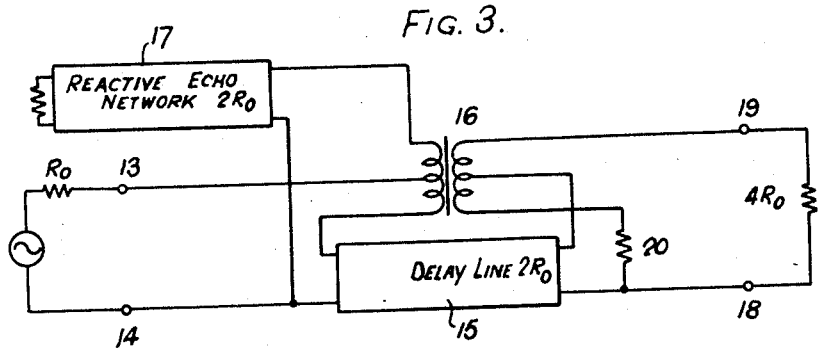
Figure 3 is a circuit of a further form of waveform corrector according to the invention.

In Figure 3 of the accompanying drawings there is shown a further form of waveform corrector according to the invention which is somewhat similar to that shown in Figure 2, but in which the two differential transformers 2 and 3 are replaced by a single transformer, the tapped primary of which constitutes (with the secondary) the first hybrid transformer means and the tapped secondary of which constitutes (with the primary) the second hybrid transformer means. Thus in Figure 3 the input terminals 13 and 13 of the corrector are connected respectively to the input of a delay line 15 having a characteristic impedance of $2R_0$, and the centre tapping of one winding of a differential transformer 16. The input terminal 14 is also connected to the input of a reactive echo network 17 having an impedance at zero frequency of $2R_0$, the other input of which is connected to the one end of the said one winding of the transformer 16, the other end of which is connected to the input of the delay line 15. One output from the delay line 15 is connected to the output terminal 18 and the other output from the delay line 15 is connected to the centre tapping point of the other winding of the transformer 16, the ends of said other winding being connected respectively to the output terminal 19 and through a balancing resistor 20 to the output terminal 18.

In the circuit shown in Figure 3 and having the relative impedance values indicated, the output voltage at low frequencies is equal to the input voltage and the minimum transducer loss is 6 db. If, however, a matching pad were provided for accommodating equal source and load impedances, the transducer loss would be increased to 17.5 db.

In the circuits of Figures 2 and 3 matching sections need not be used if an impedance ratio of 1:4 between the source impedance and the load impedance can be accommodated. Any required frequency-independent impedance change can be effected, however, by employing asymmetrical pads, and the relative levels between the signal and the echoes can be varied by means of suitable attenuators connected at appropriate points in the circuit.

Figure 4:
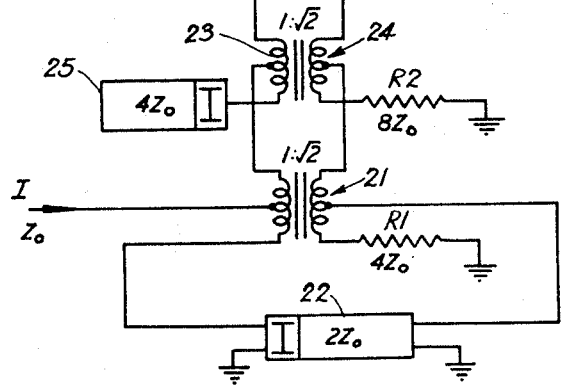
Figure 4 is a modification of the circuit shown in Figure 3.

Referring now to Figure 4 of the drawings, there is shown a modification of the circuit of Figure 3 in which a plurality of echo networks are employed, shown as having their first hybrid transformer means arranged in tandem, and as having their second hybrid transformer means arranged in tandem. In the circuit of Figure 4 the input I is applied to the centre point of one winding of a differential transformer 21, one end of which winding is connected to the input of a delay line 22 and the other end of which winding is connected to the centre tapping of one winding 23 of a second differential transformer 24. One end of the winding 23 is connected to the input of a first echo network 25 and the other end of the winding 23 is connected to the mid-point of a winding 26 of a third differential transformer 27. The ends of the winding 26 are connected respectively to a second and third echo network 28 and 29, and the output O is taken from one end of the other winding 26a of the transformer 27, the other end of winding 26a being connected to earth through a suitable impedance R3. The mid-point of winding 26a is connected to one end of the second winding of the transformer 24, the other end of which is connected through a suitable impedance R2 to earth, and the mid-point of the second winding of the transformer 24 is connected to one end of the second winding of the transformer 21, the other end of which is connected to earth through a suitable impedance R1. The output from the delay line 22 is connected to the mid-point of the second winding of the transformer 21 and it will be apparent that the circuit of Figure 4 operates in a manner similar to that of Figure 3 with the exception that there are provided three echo networks operating together. The circuit is not however limited to the use of three echo networks and further differential transformers similar to the transformer 24 can be inserted in series between the transformer 24 and the final transformer 27, each of which further transformers will have connected thereto an echo network arranged similarly to the network 25.

In the arrangement shown in Figure 4 the windings of the differential transformers have a ratio of $1:\sqrt{2}$ but it is sometimes desirable, in order to simplify the circuit requirements, to employ transformers having a winding ratio of 1:1, in which case it is necessary to feed the input signal through a centre tapped autotransformer the half coils of which are closely coupled, which is shunted by a suitable balancing impedance.

Figure 5:
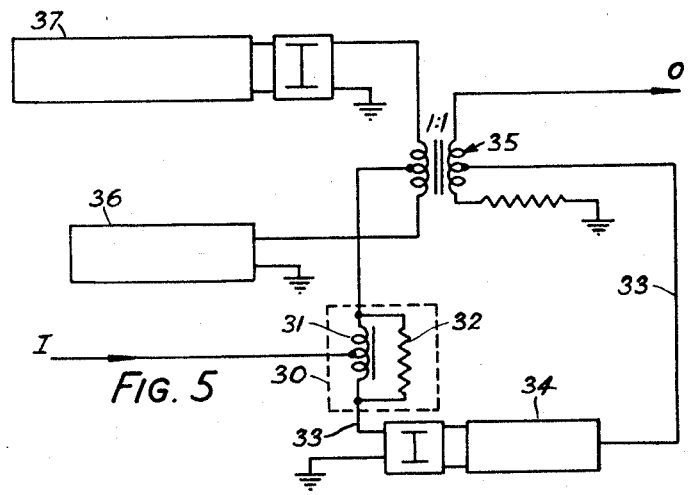
Figure 5 is a further modified form of waveform corrector according to the invention.

In Figure 5 there is shown a circuit employing a differential transformer having a winding ratio of 1:1 and as shown the input I is applied to the centre tapping of a centre tapped autotransformer 31 which is shunted by a suitable balancing impedance 32. The energy of the incoming signal is split by the autotransformer and one half of the energy progresses along the main signal path 33 which includes a delay line 34 having a delay time of $t_0$, the other half of the energy being fed through a differential transformer 35 to two echo networks 36 and 37 respectively. The delayed main signal and the echoes from the networks 36 and 37 are added in the transformer 35 and applied to the output O. There may, of course, be provided further echo networks between the transformer 35 and the output in the same manner as described with reference to Figure 4. The algebraic sum of the echoes produced in each of the echo networks 36 and 37 is made such that there is an absence of reflections at zero frequency, and this is achieved by incorporating into the echo patterns of the networks, echoes of suitable amplitude and sign at time $t_0$, i.e. the time at which the main signal arrives at the transformer 35, so that the algebraic sum of the echoes of each network is zero.

Figure 6:
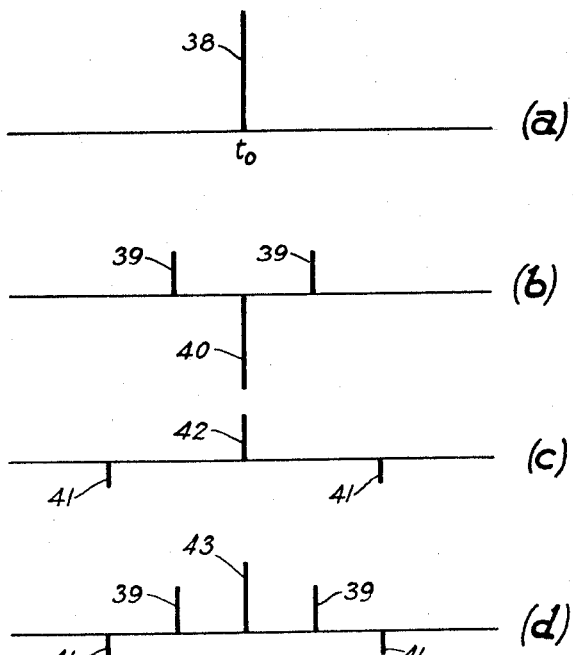
Figure 6 is a diagram showing how the echo pattern for the circuit of Figure 5 is derived; and, Figure 7 is a circuit diagram of one form of echo network suitable for use in any of the circuits of Figures 2, 3, 4 or 5.

Thus, referring to Figure 6, there is shown the echo patterns for the circuit of Figure 5, the pattern (a) showing at 38 the main signal which arrives at time $t_0$ at the transformer 35. At (b) there is shown the echo pattern from the network 36 in which the two positive echoes 39 which are spaced in time equally to each side of the time $t_0$, are balanced by a negative echo 40 equal to the sum of the echoes 39 so that the algebraic sum of the echoes 39 and 40 is zero. The echo pattern from the network 37 is shown at (c) and in a manner similar to that of network 36, two negative echoes 41 are balanced by a single positive echo 42 at time $t_0$ and equal to the sum of the echoes 41. The pattern of the output signal is shown at (d) and comprises the negative echoes 41 of the network 37, the positive echoes 39 of the network 36 and an output signal 43 which is the algebraic sum of the main signal 38, the negative echo 40 of network 36 and the positive echo 42 of the network 37. It will be understood that the echo patterns shown in Figure 6 are given only as an example, and other patterns can be generated in which the components are not necessarily equally spaced in time from time $t_0$ nor are they necessarily equal in amplitude.

In the embodiments of the invention so far described the windings of the differential transformers have been shown and described as centre tapped and, in consequence, the impedances connected to the ends of the windings must be equal at zero frequency in order to prevent magnetisation of the cores of the transformers by the main signal. It is found, however, that it is possible to prevent magnetisation of the cores by relating the ratio of the number of turns at each side of the tapping to the respective impedances connected to the ends of the windings.

Thus, for example, referring to the circuit of Figure 3 the impedance for the main path from the transformer 16 through the delay line 15 can be made equal to $aR_0$ where $a>1$ and the echo network 17 is made to have a zero-frequency impedance of $$\frac{a}{a-1}R_0$$

The input 13 is then connected to a tapping of the primary winding of the transformer 16 in such manner that the tapping divides the total number of primary turns N of the primary winding into $$\frac{a-1}{a}N \text{ and } \frac{1}{a}N$$

respectively in order to prevent magnetisation of the core of the transformer by the main signal. Similarly the load impedance connected to the output terminals 18 and 19 need not be equal to the balancing impedance 20 and the load impedance may be made equal to $abR_0$ and the balancing impedance $$\frac{ab}{b-1}R_0 \text{ where } b>1$$

The output of the delay line 15 is then connected to a tapping of the secondary winding of the transformer 16 so as to divide the total number M of secondary turns into $$\frac{b-1}{b}M \text{ and } \frac{1}{b}M$$

respectively. In order to prevent reflected energy which emerges from the echo network from entering the main path delay line the ratio of the turns of the primary and secondary windings of the transformer 16, i.e.

$$\frac{N}{M}$$

must be equal to $$\frac{1}{b}\sqrt{\frac{a(b-1)}{a-1}}$$

The freedom in the selection of impedance ratios thus obtained makes it possible to vary the distribution of received energy to the main and echo paths, and it will be apparent that as the product $ab$ approaches unity the amount of energy carried by the main path increases while a given irregularity in the echo network will produce more and more echo energy at the output as $b$ increases, while the value of $a$ is maintained at $a=2$.

Figure 7:
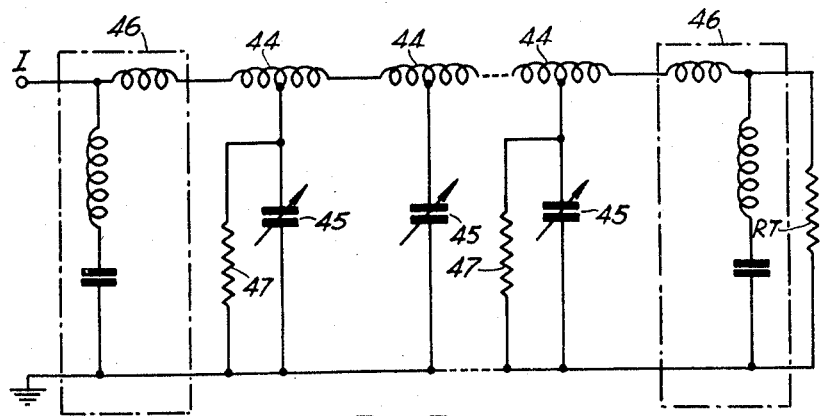

Referring now to Figure 7, there is shown one form of echo network suitable for use in a waveform corrector according to the invention. The echo network of Figure 7 comprises a plurality of delay units connected in cascade and each formed by a centre tapped inductor 44, the halves of which are coupled and the centre tap of each of which is connected to earth through a variable capacitor 45. The series of delay units is terminated at each end by a $m$-derived half-section 46 in order to provide good matching and at the end of the circuit distant from the input end a terminating impedance RT is provided to give the required impedance at zero frequency. In order to off-set the effect of the series resistances inherent in the inductors 44 and thereby provide uniform dissipation, selected of the delay units are provided with shunt resistors 47 connected across the repective capacitors 45.

It will be understood that other types of echo networks can be employed always providing that their input impedance at zero frequency is such as will prevent magnetisation of the core or cores of the differential transformers. For example, the echo network may be formed by a tandem connection of dissipationless delay lines each of a different impedance, the series of delay lines being terminated at the end distant from the input by an impedance as in the circuit described with reference to Figure 7.

It will be likewise understood that the invention is not limited to the above described embodiments thereof, while at the same time it will be appreciated from the aforegoing description of the various embodiments that the essential features of a circuit according to the invention include:

(a) A main path which passes D.C., and A.C. of all frequencies up to the range where the leakages between the two halves of the differential windings, and stray capacitances, become significant;

(b) The signal transmitted over the main path, i.e. the main signal, does not magnetise the core of cores of the transformers; and, (c) One or more auxiliary or echo paths the low frequency behaviour of which depends on the shunt inductance of the transformer or transformers. The echo signals produced by echo networks associated with any one transformer should therefore be substantially free from D.C. and low frequency components. However, as described above with reference to Figures 5 and 6, the D.C. component of an echo pattern can always be reduced to zero by incorporating into it an echo of suitable magnitude and sign coinciding in time with the delayed main signal.

Furthermore it will be apparent that by employing a delay line for transmitting the signal from the input to the output and by transmitting the echoes to the output independently of the delay line, the time relation between the main signal and the echoes can be arbitrarily selected and it is therefore possible to employ echoes which precede the main signal.

I claim:

1. An echo waveform corrector comprising an input circuit, an output circuit, a delay line connected between said input circuit and said output circuit providing a main path for the transmission to said output circuit of signals applied to said input circuit, an echo generating circuit, first hybrid transformer means connecting said input circuit to said echo generating circuit, said echo generating circuit producing echoes of said signals having no direct current component and said hybrid transformer means being connected to prevent said echoes from being transmitted over said main path, and second hybrid transformer means connected between said echo generating circuit and said output circuit providing an auxiliary path for the transmission of said echoes to said output circuit, said second hybrid transformer means being connected to prevent said echoes from being fed back through said main path and to prevent signals transmitted over said main path from being fed back to said echo generating and input circuits.

2. An echo waveform corrector according to claim 1, including a plurality of said echo generating circuits, a plurality of said first hybrid transformer means connecting said input circuit to said echo generating circuits respectively, and a plurality of said second hybrid transformer means connecting said echo generating circuits, respectively, to said output circuit.

3. An echo waveform corrector according to claim 2, said plurality of first hybrid transformer means being connected in tandem and said plurality of second hybrid transformer means being connected in tandem.

4. An echo waveform corrector according to claim 2, said plurality of echo generating means each comprising a network for generating a reactive echo and means for incorporating into the echo pattern thereof a further echo timed to coincide with the main signal delayed by said delay line and of such sign that the algebraic sum of the echoes of each network is zero.

5. An echo waveform corrector according to claim 1, further comprising a second echo generating circuit, said first hybrid transformer means having its opposite ends connected respectively to said first named echo generating circuit and to said second echo generating circuit.

6. An echo waveform corrector according to claim 5, further comprising autotransformer means connecting said input circuit to said delay line and to said first hybrid transformer means for splitting said signals applied to said input circuit between said delay line and said first hybrid transformer means.

References Cited in the file of this patent

UNITED STATES PATENTS

| | | |
|---|---|---|
| 2,266,154 | Blumlein | Dec. 16, 1941 |
| 2,421,340 | Levy | May 27, 1947 |
| 2,707,751 | Hance | May 3, 1955 |